(No Model.)

F. M. UNDERHILL.
WATER COOLER.

No. 536,243. Patented Mar. 26, 1895.

WITNESSES:
R. B. Shephard.
Geo. E. Morse

INVENTOR
Francis M. Underhill,
BY Briesen & Knauth
ATTORNEYS

UNITED STATES PATENT OFFICE.

FRANCIS M. UNDERHILL, OF NEW YORK, N. Y., ASSIGNOR TO WHITALL, TATUM & CO., OF SAME PLACE.

WATER-COOLER.

SPECIFICATION forming part of Letters Patent No. 536,243, dated March 26, 1895.

Application filed May 23, 1894. Serial No. 512,176. (No model.)

*To all whom it may concern:*

Be it known that I, FRANCIS M. UNDERHILL, a resident of the city, county, and State of New York, have invented a certain new and useful Improvement in Water - Coolers, of which the following is a specification.

My invention relates to water coolers, and has for its object to produce a simple, cheap and efficient portable water cooler, one which is light, can be easily handled, and in which the water receptacle can be held rigidly in place when it is desired to transport the cooler or to pour from it direct without removing the containing vessel.

To this end my invention consists of a water cooler comprising a main receptacle having double walls throughout with an air space between the walls, a containing vessel adapted to fit snugly within the main receptacle and extending above the same, and a cover also having double walls throughout with an air space between the walls, and also in having a flange or extension, which flange extends from said cover into the main receptacle, when the cover is in place thereon, in such a manner as to prevent the containing vessel from moving, the inner wall of said cover at the same time forming a tight cover for the containing vessel and main vessel as well.

I attain the object of my said invention by means of the construction shown in the accompanying drawings, in which—

Figure 1:
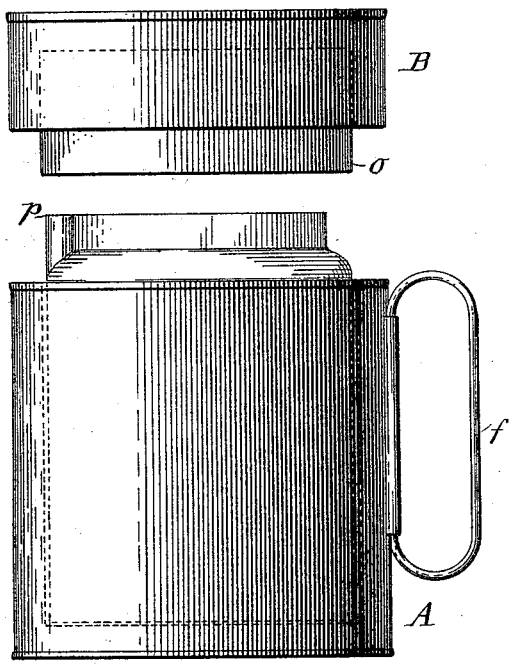
Figure 2:
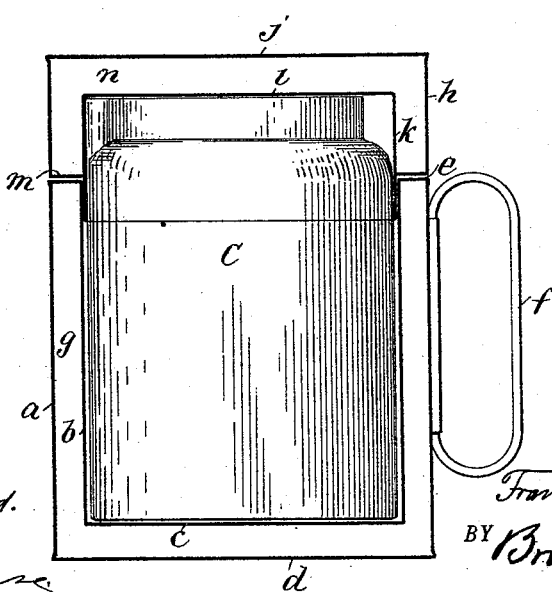

Figure 1 is an elevation of one form of my invention showing the cover removed. Fig. 2 is a partial central vertical section of the device shown in Fig. 1 showing the cover in place on the main receptacle.

In the drawings, A indicates the main receptacle. This receptacle is preferably cylindrical in form and consists of an outer wall or partition *a* and an inner wall or partition *b* and the double bottom *c d*, the bottom *c* forming part of the inner wall of the vessel and the bottom *d* forming part of the outer wall of the vessel. A rim or curb *e* is provided to cover the space between the outer and inner walls of the receptacle. It will thus be seen that the main receptacle consists practically of two receptacles placed one within the other with a sealed air space *g* between them to form a receptacle with double walls, and having a curb to inclose the air jacket, which curb forms the only means of transmitting heat or cold from the outer to the inner walls of the main receptacle. The main receptacle is also provided with a handle *f*, which handle is so located as to permit the contents of the vessel to be readily poured therefrom. The cover B consists of the outer wall *h* and its cap *j*, the inner wall *k* and its cap *l*, and the rim *m*, the walls, caps and rim serving to inclose an air space *n*, as in the case of the main receptacle; the rim forming the only connection for the transmission of heat or cold from the inner to the outer walls of the cover. The inner wall *k* is provided with a flange or extension *o*, which flange or extension is entered into the main receptacle when the cover is in place on the main receptacle, as clearly shown in the sectional view in Fig. 2, for purposes which will be hereinafter referred to.

Snugly seated in and supported by the main receptacle and readily removable therefrom is a vitreous water jar or containing vessel C which extends above the top of the main receptacle and is preferably provided with a lip or spout *p*, so that by grasping the handle, the main receptacle with its contained jar can be tilted and the water readily poured from the spout without removing said containing jar. The jar may, however, if desired, be firmly seated in the main chamber or attached thereto; the main object being to extend the mouth of the containing vessel above the main receptacle, so that the device can be used in the same manner as an ordinary ice pitcher. It will also be found advantageous to have the water jar fit snugly within the main chamber, as when the cover is in place the flange *o* will serve as a packing between the water jar and the inner wall of the main chamber to hold the water jar rigidly in place and to prevent the same from wabbling when the water cooler is transported, at the same time forming a break joint between the cover and the main receptacle to prevent the admission of hot air to the vessel.

The designed mode of using my improvement is to fill the water jar with cold or hot water which it is desired to maintain at a constant temperature for a considerable length of time to place the same within the main receptacle and to put on the cover when the liquid will remain at or near its initial temperature for a considerable length of time owing to the non-conducting properties of the air space between the walls of the water cooler.

What I claim, and desire to secure by Letters Patent, is—

1. In a portable water cooler, the combination of a main receptacle having double walls, of a sealed air space between the walls, a containing vessel within said main receptacle extending above the same, a cover having double walls, with a sealed air space between the walls, and having its inner wall provided with a flange or extension adapted for insertion into the main receptacle when the cover is in position thereon, substantially as and for the purposes described.

2. The combination in a water cooler, of a main receptacle having double walls, with an air space between the walls, a handle therefor, a water containing vessel fitting snugly within and having the mouth thereof extend above said main receptacle, a cover having double walls, with an air space between the walls, and provided with a flange adapted to enter the space between the water containing receptacle and the inner wall of the main receptacle when the cover is in place on the main receptacle, and to bind the water containing receptacle from movement in the main receptacle, said cover forming when in place a tight cover for both the main receptacle and the containing vessel, substantially as described.

FRANCIS M. UNDERHILL.

Witnesses:
CHARLES H. LESTER,
HARRY M. TURK.